US010966166B2

(12) United States Patent
Olsson et al.

(10) Patent No.: US 10,966,166 B2
(45) Date of Patent: Mar. 30, 2021

(54) PREAMBLE POWER LEVEL SCALING

(71) Applicant: Telefonaktiebolaget LM Ericsson (publ), Stockholm (SE)

(72) Inventors: Thomas Olsson, Karlshamn (SE); Leif Wilhelmsson, Dalby (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 220 days.

(21) Appl. No.: 16/300,930

(22) PCT Filed: May 13, 2016

(86) PCT No.: PCT/EP2016/060925
§ 371 (c)(1),
(2) Date: Nov. 12, 2018

(87) PCT Pub. No.: WO2017/194176
PCT Pub. Date: Nov. 16, 2017

(65) Prior Publication Data
US 2020/0322899 A1  Oct. 8, 2020

(51) Int. Cl.
*H04W 52/34* (2009.01)
*H04W 52/28* (2009.01)
(Continued)

(52) U.S. Cl.
CPC ....... *H04W 52/346* (2013.01); *H04W 52/281* (2013.01); *H04W 52/325* (2013.01); *H04W 52/48* (2013.01); *H04W 52/50* (2013.01)

(58) Field of Classification Search
CPC combination set(s) only.
See application file for complete search history.

(56) References Cited

U.S. PATENT DOCUMENTS 7,826,417 B2   11/2010  Yang et al.
2006/0245509 A1*  11/2006  Khan ............... H04B 7/0684
                                           375/260
(Continued)

FOREIGN PATENT DOCUMENTS

WO   2009034221 A1   3/2009

OTHER PUBLICATIONS

PCT International Search Report, dated Jan. 23, 2017, in connection with International Application No. PCT/EP2016/060925, all pages.
(Continued)

*Primary Examiner* — Ankur Jain
(74) *Attorney, Agent, or Firm* — Leffler Intellectual Property Law, PLLC

(57) ABSTRACT

Disclosed here is a method of a network access point configured to operate in a wireless network. The wireless network comprises at least one wideband channel. The wireless network further comprises one or more wideband terminals configured to transmit and receive in the wideband channel, and one or more narrowband terminals configured to transmit and receive in one or more narrowband channels comprised within the wideband channel. The method comprises initiating a downlink transmission for at least one of the one or more wideband terminals and for a first narrowband terminal and transmitting a preamble over the wideband channel for synchronization of the at least one wideband terminal and the at least one narrowband terminal, wherein a first transmission power of the preamble in a first narrowband channel comprised within the wideband channel is higher than a second transmission power of the preamble in the remainder of the wideband channel not comprising the one or more narrowband channels. Also disclosed is an arrangement of an AP and a computer program product.

18 Claims, 3 Drawing Sheets

(51) Int. Cl.
*H04W 52/32* (2009.01)
*H04W 52/48* (2009.01)
*H04W 52/50* (2009.01)

(56) References Cited

U.S. PATENT DOCUMENTS

| | | | |
|---|---|---|---|
| 2007/0265016 | A1 | 11/2007 | Kahtava et al. |
| 2010/0067379 | A1* | 3/2010 | Zhao .................... H04W 28/16 370/235 |
| 2010/0080311 | A1 | 4/2010 | Moffatt et al. |
| 2014/0362935 | A1 | 12/2014 | Porat et al. |
| 2017/0141833 | A1* | 5/2017 | Kim ..................... H04L 1/0029 |
| 2017/0265105 | A1* | 9/2017 | Azizi ................... H04W 48/12 |
| 2017/0367058 | A1* | 12/2017 | Pelletier ............ H04W 56/0045 |
| 2019/0021081 | A1* | 1/2019 | Ljung ............... H04W 72/0453 |

OTHER PUBLICATIONS

PCT Written Opinion, dated Jan. 23, 2017, in connection with International Application No. PCT/EP2016/060925, all pages.

Hui Tian et al., "Power Ramping Schemes for M2M and H2H Co-existing Scenario", China Communication, China Institute of Communications, Piscataway, NJ, USA, vol. 10, No. 3, Mar. 1, 2013, pp. 100-113.

3GPP TSG-RAN WG1 NB-IOT AdHoc, R1-160079, Jan. 18-22, 2016, Budapest, Hungary, Ericsson, "NB-IoT-Synchronization Channel Design", pp. 1-6.

Rapeepat Ratasuk et al., "NB-IoT System for M2M Communication", Workshop on Device to Device communications for 5G Networks (WD5G 2016), 2016 IEEE Wireless Communications and Networking Conference, Apr. 3, 2016, pp. 1-5.

* cited by examiner

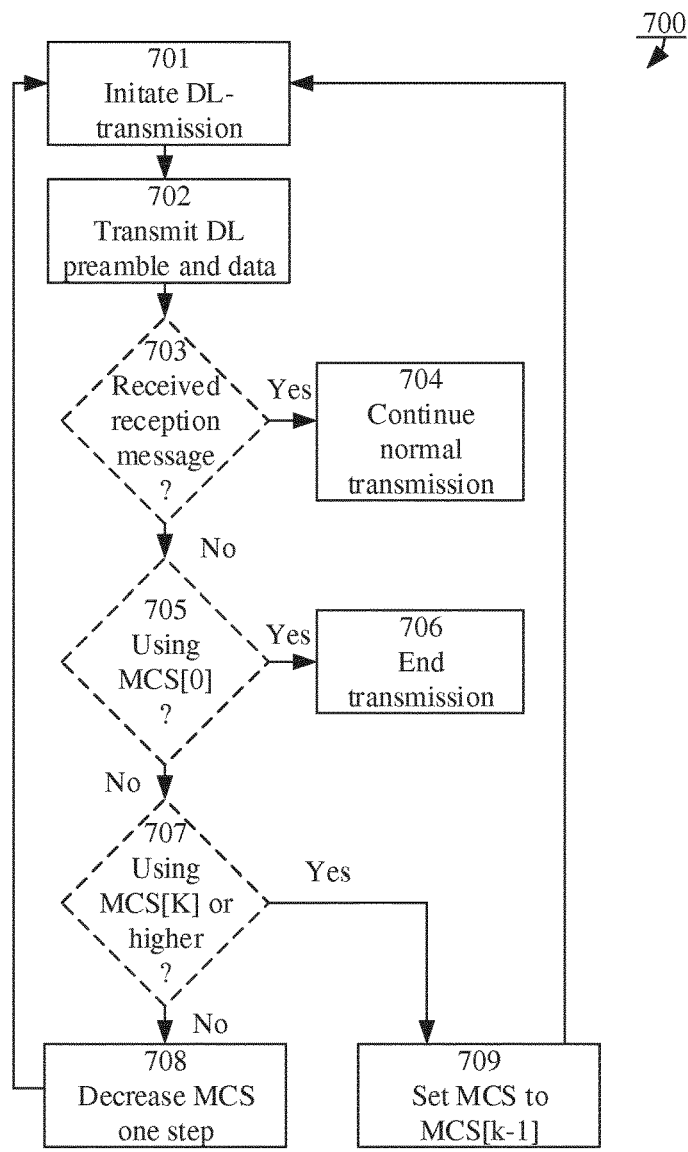
Fig. 7
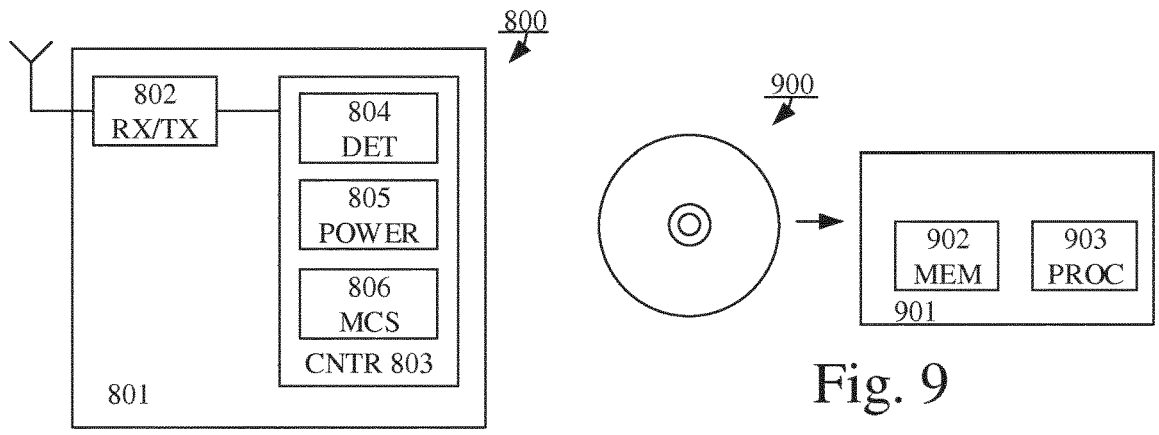
Fig. 8
Fig. 9

PREAMBLE POWER LEVEL SCALING

TECHNICAL FIELD

The present invention relates generally to the field of wireless communication in a multi user network. More particularly, it relates to wireless communication with terminals operating on wideband and narrowband frequency ranges within a bandwidth.

BACKGROUND

Internet of Things (IoT) is expected to increase the number of connected devices significantly. A vast majority of these devices will likely operate in unlicensed bands, in particular the 2.4 GHz ISM (Industrial, Scientific and Medical) band.

However, there will typically also be an increased demand for using the unlicensed bands for services that traditionally have been supported in licensed bands. As an example of the latter, third generation partnership project (3GPP) that traditionally develops specifications only for licensed bands have now also developed versions of Long Term Evolution (LTE) which will operate in the 5 GHz unlicensed band.

Technologies that are typically expected to dominate for IoT services are Bluetooth Wireless Technology, in particular Bluetooth Low Energy (BLE), and future versions of IEEE 802.11. With respect to IEEE 802.11, there are currently efforts to standardize a long range low power (LRLP) mode which at least to some extent builds upon IEEE 802.11ax IoT applications may typically have rather different requirements and features compared to applications like e.g. file down-load and video streaming. Specifically, IoT applications would typically only require low data rate, and the amount of data transmitted in a single packet may many times only be a few bytes. In addition, the transmissions to and from many devices may typically be very seldom, e.g. once every hour or even less.

The number of IoT devices is expected to be huge which means that although the amount of data to each of the devices may be small, the aggregated IoT data may still be substantial.

Many use cases for IoT applications can typically be found in an ordinary house, and may be related to various sensors, attenuators, etc. The requirements for coverage are therefore substantially less demanding than what usually can be achieved by e.g. a cellular system. On the other hand, the coverage which can be obtained by e.g. Bluetooth or 802.11b/g/n/ac may not suffice. This may typically be true if one of the devices is outdoors whereas the other device is indoors so that an exterior wall with rather high penetration loss, such as a concrete wall, is in between the devices.

The straight-forward approach to increase the range of a communication link is typically to reduce the bit rate that is used. Reducing the bit rate by necessity means that it will take longer to transmit a packet of a certain size. As a side effect of this, the channel will typically be occupied for a longer time. However, with a large number of devices sharing the same channel, the channel may be congested if this sharing is not done in an effective manner. The need for long packets and the increased number of users will typically make this congestion even more pronounced.

Moreover, the amount of non-IoT data, e.g. data download and video streaming, sent over the same channel may also increase. This implies that to obtain good performance for both IoT applications and non-IoT applications some coordination should preferably take place.

An obvious, and probably the simplest, way to do such coordination is probably by time sharing between the systems.

However, as the data rate for the IoT system is very low for the individual links, it may likely be hard to obtain good spectrum efficiency in this way.

Therefore, there is a need for methods and arrangement of a network access point for enabling simultaneous communication between devices, e.g. IoT-devices and non IoT-devices, operating on different frequency ranges and physical distances in a wireless network.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

It is an object of some embodiments to mitigate at least some of the above disadvantages and to provide methods and arrangements of a network access point (AP) as well as a computer program product enabling reliable and concurrent communication between terminals operating in wideband channels and/or frequencies, and terminals operating in narrowband channels and/or frequencies.

According to a first aspect, this is achieved by a method of a network access point configured to operate in a wireless network. The wireless network comprises at least one wideband channel. The wireless network further comprises one or more wideband terminals configured to transmit and receive in the wideband channel, and one or more narrowband terminals configured to transmit and receive in one or more narrowband channels comprised within the wideband channel.

The method comprises initiating a downlink transmission for at least one of the one or more wideband terminals and for a first narrowband terminal and transmitting a preamble over the wideband channel for synchronization of the at least one wideband terminal and the first narrowband terminal.

A first transmission power of the preamble in a first narrowband channel comprised within the wideband channel is higher than a second transmission power of the preamble in the remainder of the wideband channel not comprising the one or more narrowband channels.

In some embodiments, the wireless network utilizes orthogonal frequency division multiplexing (OFDM), and the wideband channel may be divided into a plurality of subchannels. The narrowband channel may correspond to the bandwidth of one subchannel or a subset of the plurality of subchannels and the wideband channel may correspond to the total bandwidth of all of the plurality of subchannels.

In some embodiments, the method further comprises determining whether the preamble was received by the first narrowband terminal. Determining whether the preamble was received by the first narrowband terminal may comprise determining whether a reception message has been received from the first narrowband terminal.

In some embodiments, the reception message may be at least one of an acknowledgement message or a non-acknowledgement message.

In some embodiments, the method may further comprise, if it is determined that the preamble has not been received by the first narrowband terminal, increasing the first transmission power of the preamble in the first narrow band channel.

In some embodiments, the method may further comprise, if it is determined that the preamble has not been received by the first narrowband terminal, decreasing the second transmission power of the preamble in the remainder of the wideband channel not comprising the one or more narrowband channels.

In some embodiments, the method may further comprise, if it is determined that the preamble has not been received by the first narrowband terminal, increasing a robustness of data sent in the first narrowband channel.

In some embodiments, increasing the robustness of data sent in the first narrowband channel may be achieved by increasing the coding gain of the data by decreasing a modulation and coding scheme value.

In some embodiments, the method may further comprise transmitting data in the first narrowband channel comprised within the wideband channel to the first narrowband terminal. A third transmission power of the data in the first narrowband channel comprised within the wideband channel is lower than the first transmission power of the preamble in the first narrowband channel comprised within the wideband channel.

For instance, in some embodiments, the first and second transmission powers may be used for transmitting the preamble over the wideband channel, wherein the first transmission power is higher than the second transmission power. The third transmission power may be used for transmitting data and may be lower than the first transmission power.

In some embodiments, a weighted power spectral density of the preamble and data in the first narrowband channel comprised within the wideband channel may be below a power spectral density threshold.

The power spectral density threshold may e.g. be 10 dBm per MHz.

The increase or decrease in transmission power and coding gain may e.g. result in that the power spectral density threshold is not exceeded.

For instance, if the AP determines that it cannot vary the transmission and/or robustness any more, but the narrowband terminals have still not acknowledged a receipt of the preamble, the AP may in some embodiments stop transmission to the narrowband terminals.

In some embodiments, the method further comprises initiating a down link transmission for a second narrowband terminal and transmitting the preamble over the wideband channel for synchronization of the second narrowband terminal.

A fourth transmission power of the preamble in a second narrowband channel comprised within the wideband channel is higher than the second transmission power of the preamble in the remainder of the wideband channel not comprising the one or more narrowband channels.

A second aspect is a computer program product comprising a computer readable medium, having thereon a computer program comprising program instructions. The computer program may be loadable into a data-processing unit having a memory and a processor and adapted to cause execution of the method according to the first aspect.

A third aspect is an arrangement of a network access point configured to operate in a wireless network. The wireless network comprises at least one wideband channel. The wireless network further comprises one or more wideband terminals configured to transmit and receive in the wideband channel, and one or more narrowband terminals configured to transmit and receive in one or more narrowband channels comprised within the wideband channel.

The arrangement comprises a transceiver and a controller configured to cause initiation of a down link transmission for at least one of the one or more wideband terminals and for a first narrowband terminal. The controller is further configured to cause transmission of a preamble over the wideband channel for synchronization of the at least one wideband terminal and the first narrowband terminal.

A first transmission power of the preamble in a first narrowband channel comprised within the wideband channel is higher than a second transmission power of the preamble in the remainder of the wideband channel not comprising the one or more narrowband channels.

In some embodiments, the controller may further comprise a determiner configured to determine if a preamble has been received by the first narrowband terminal, a power unit configured to determine the level of, and set the transmission power of the preamble, and a modulating and coding scheme unit configured to determines the level of, and set the coding gain of a data transmission following the preamble.

In some embodiments, the controller may further be configured to cause determination of whether the preamble was received by the first narrowband terminal. Determination of whether the preamble was received by the first narrowband terminal may comprise causing determination of whether a reception message has been received from the first narrowband terminal.

In some embodiments, the controller may further be configured to cause, if it is determined that the preamble has not been received by the first narrowband terminal, increase of the first transmission power of the preamble in the first narrow band channel comprised within the wideband channel.

In some embodiments, the controller may further be configured to cause, if it is determined that the preamble has not been received by the first narrowband terminal, decrease of the second transmission power of the preamble in the remainder of the wideband channel not comprising the one or more narrowband channels.

In some embodiments, the controller may further be configured to cause, if it is determined that the preamble has not been received by the first narrowband terminal, increase of a robustness of data sent in the first narrowband channel.

In some embodiments, the controller may further be configured to cause, transmission of data in the first narrowband channel comprised within the wideband channel to the first narrowband terminal. A third transmission power of the data in the first narrowband channel comprised within the wideband channel may be lower than the first transmission power of the preamble in the first narrowband channels comprised within the wideband channel.

The third transmission power may be utilized for transmitting data to the first narrowband terminal.

In some embodiments, a weighted power spectral density of the preamble and data in the one or more narrowband channels comprised within the wideband channel is below a power spectral density threshold.

In some embodiments, the controller may further be configured to cause initiation of a downlink transmission for a second narrowband terminal and transmission of the preamble over the wideband channel for synchronization of the second narrowband terminal.

A fourth transmission power of the preamble in the second narrowband channel comprised within the wideband channel is higher than the second transmission power of the preamble in the remainder of the wideband channel not comprising the one or more narrowband channels.

In some embodiments, the third aspect may additionally have features identical with or corresponding to any of the various features as explained above for the first aspect.

An advantage of some embodiments is that a wireless network is enabled where wideband and narrowband terminals may exist concurrently.

Another advantage of some embodiments is that robust and reliable communication is achieved in a wireless network where both wideband and narrowband terminals operate.

Another advantage of some embodiments is that an AP will be able to accommodate a large number of terminals supporting internet of things like applications concurrently with terminals that are supporting other applications than internet of things like applications in a wireless network environment.

Another advantage of some embodiments is that the unlicensed bands may be efficiently utilized.

BRIEF DESCRIPTION OF THE DRAWINGS

Further objects, features and advantages will appear from the following detailed description of embodiments, with reference being made to the accompanying drawings, in which:

FIG. 7 is a flow chart illustrating example method steps according to some embodiments;

FIG. 8 is a block diagram illustrating an example arrangement according to some embodiments; and FIG. 9 is a block diagram illustrating an example computer program product according to some embodiments.

DETAILED DESCRIPTION

Figure 1:
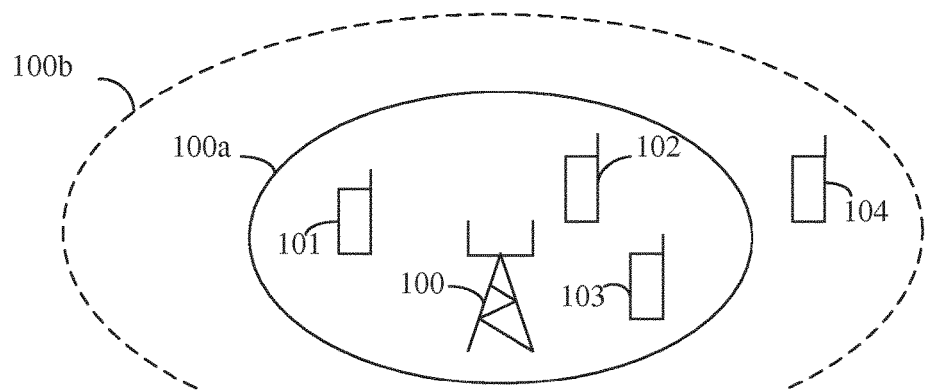
FIG. 1 is a schematic drawing illustrating a network scenario according to some embodiments.

In the following, embodiments will be described where transmissions from an access point (AP) to terminals utilizing a wideband channel may be transmitted concurrently with transmissions to terminals utilizing a narrowband channel within the wideband channel in a wireless network.

The term access point may be interpreted as a network base station, router, evolved node B (eNB) or the like.

The term terminal may be interpreted as a network terminal, network station, wireless communication device, mobile terminal or the like.

In this disclosure, a terminal utilizing a wideband channel will be denoted as a wideband terminal and a terminal utilizing a narrowband channel will be denoted a narrowband terminal. Narrowband terminals may e.g. be Internet of things (IoT) devices operating with long range and low power.

The terms wideband and narrowband are relative expressions and there is no exact definition of how wide in frequency a wideband is or how narrow in frequency a narrowband is. In this disclosure, a wideband is to be considered as wider than a narrowband.

When describing or defining wideband and narrowband is also common to refer to frequency flat and frequency selective.

For instance, if the bandwidth of a signal is large, e.g. 20 MHz, then the channel will typically vary considerably over the bandwidth and may be considered as frequency selective, whereas if the bandwidth frequency range of the signal is relatively small, e.g. 1 MHz, the channel may often be approximated as being frequency flat within the bandwidth of the signal.

The numerical values presented above may be used to classify a signal as wideband (i.e. 20 MHz or narrowband (i.e. 1 MHz) respectively and are representative when the distance between the transmitter and the receiver is rather short, typically in the range of 10 to 100 meters.

A narrowband channel is typically smaller than the coherence bandwidth (i.e. the maximum range of frequency where the channel response is flat), and smaller than the wideband channel which typically exceeds the coherence bandwidth.

The terms wideband and narrowband are relative, and the sizes of the bands may typically be in kHz, MHz or GHz depending on the type of application used.

Furthermore, the wireless network may utilize orthogonal frequency division multiplexing (OFDM) which makes it possible to divide the bandwidth into a number of subcarriers being grouped into resource units or subchannels.

Terminals operating within a wireless network will typically be synchronized by an access point (the access point may e.g. be a base station, router, eNB or the like).

In an OFDM system there may be a preamble used for signal detection, course frequency offset estimation and FFT (Fast Fourier Transform) timing alignment. This is for instance the case for OFDM system based on the IEEE 802.11 standard. The preamble is normally designed to be robust in various channel conditions, while the following data use different modulation and coding schemes (MCS) depending on the channel, i.e., the same preamble is used for a potentially large set of MCS.

In the following, the notation that MCS=0 is the most robust modulation and coding scheme, MCS=1 is the second most robust and so on will be used. In case there would be e.g. 10 different MCS, MCS=9 would then be the least robust. As an example MCS=0 may correspond to that the modulation used is binary phase shift keying (BPSK) and the code rate is r=½, MCS=1 may correspond to that the modulation is quadrature phase shift keying (QPSK) and the coding rate is r=½, MCS=2 may correspond to that the modulation is QPSK and the coding rate is r=¾, MCS=3 may correspond to that the modulation is 16-QAM and the coding rate is r=½, and so one, where, in general, either the modulation order is increased or the rate of the error correcting code is decreased in every increase of the MCS value.

The result is that for transmissions with high MCS or MCS value, the preamble is very robust compared to the subsequent control and data transmissions, while for transmission with low MCS the difference in robustness is much less if any.

Thus, prior to any down link (DL) transmission of data from the AP, a preamble is transmitted in a wideband channel of the wireless network to the terminals within the network in order to synchronize them.

However as it is necessary for some IoT applications to have connectivity standards with low power consumption and long range, the wireless network may comprise both wideband and narrowband terminals. Since the wideband and narrowband terminals may operate at different ranges and at different powers, there is a risk that the preamble is not received with sufficient power by all terminals in the network.

FIG. 1 illustrates a typical example of such a network scenario. The network of FIG. 1 is in some embodiments an OFDM system comprising at least one wideband channel, wherein the wideband channel is divided into a plurality of subchannels. The total bandwidth of the plurality of subchannels may e.g. correspond to the wideband channel, wherein a bandwidth of one or a subset of the plurality of subchannels may correspond to one or more narrowband channels.

In FIG. 1, access point 100 transmits to wideband terminals 101, 102, 103 located within a first transmission area 100a, and to narrowband terminal 104 located within a second transmission area 100b which is outside the first transmission area 100a.

The access point 100 may transmit the preamble over the wideband channel using a total transmission power which is equally divided over the plurality of subchannels of the wideband channel. Thus, the wideband terminals 101, 102, 103 will be able to receive the preamble, however there is a risk that the narrowband terminal 104 does not since it is located physically further away from the access point 100 and the transmission power may not be sufficient for reaching the narrowband terminal 104.

Figure 2:
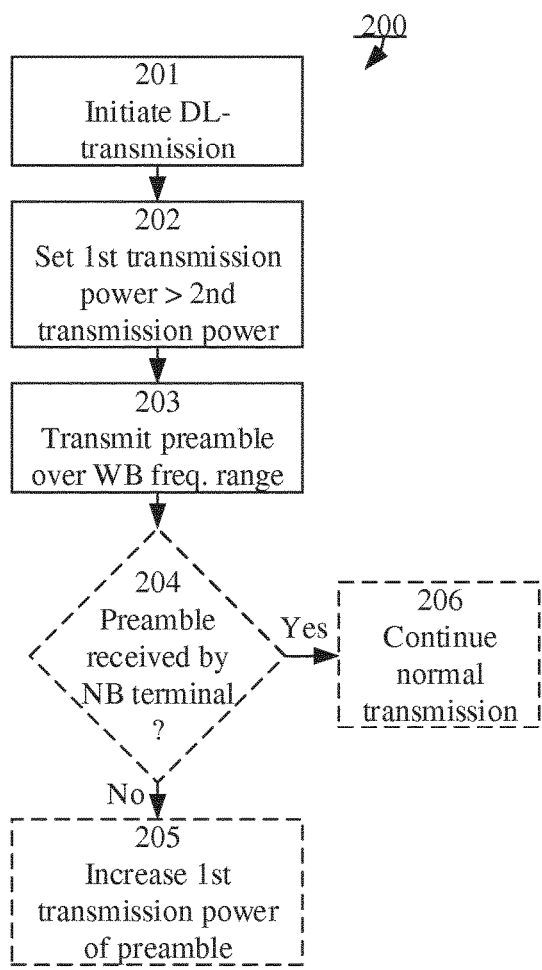
FIG. 2 is a flow chart illustrating example method steps according to some embodiments.

FIG. 2 illustrates an example method 200 according to some embodiments enabling flexible scaling of the preamble such that narrowband terminals may receive the preamble without negatively affecting the range and power of the wideband transmission.

The method 200 is for a network access point (e.g. the AP described in conjunction with FIG. 1) configured to operate in a wireless network. The wireless network comprises at least one wideband channel. The wireless network further comprises one or more wideband terminals (e.g. the wideband terminals 101, 102, 103 of FIG. 1) configured to transmit and receive in the wideband channel, and one or more narrowband terminals (e.g. the narrowband terminal 104 of FIG. 1) configured to transmit and receive in one or more narrowband channels comprised within the wideband channel.

The method 200 starts in 201 where the AP initiates a down link transmission for at least one of the one or more wideband terminals and for a first narrowband terminal.

In 202 the AP transmits a preamble over the wideband frequency range for synchronization of the at least one wideband terminal and the first narrowband terminal.

The AP transmits the preamble to the wideband and narrowband terminal such that a first transmission power of the preamble in a first narrowband channel comprised within the wideband channel is higher than a second transmission power of the preamble in the remainder of the wideband frequency range.

If the wireless network utilizes OFDM, then in some embodiments, the wideband channel may be divided into a plurality of subchannels, wherein the total bandwidth of all of the subchannels corresponds to the wideband channel, and the bandwidth of one or a subset of the plurality of subchannels corresponds to the one or more narrowband channels.

Thus, the narrowband terminal may be configured to operate on one or a subset of the plurality of subchannels, whereas the wideband terminal may be configured to operate on all of the plurality of subchannels of the wideband channel.

In some embodiments, the method 200 may optionally further comprise step 204 where the AP determines whether the preamble was received by the first narrowband terminal.

In order to determine whether the preamble was received by the first narrowband terminal, the AP may check if it has received a reception message from the first narrowband terminal.

A reception message may e.g. be an acknowledgement message or a non-acknowledgement message.

If so (Yes-path out of 204), the AP may determine that the preamble was received and it may in 206 proceed with normal transmission, i.e. transmitting a new preamble followed by data to the wideband and first narrowband terminal in the network, where the new preamble is transmitted with equal transmission power as the preamble that was received successfully by the first narrowband terminal.

However, if the AP determines that the preamble was not received by the first narrowband terminal (No-path out of 204), the AP may in 205 increase a first transmission power of the preamble, and transmit the preamble to the terminals again.

If OFDM is used it is possible to alter the transmission power of the preamble such that it is increased in some subchannels of the wideband channel and possibly decreased in others.

The different power levels on different subchannels may e.g. be achieved by scaling the different frequency components of the preamble before applying an inverse fast Fourier transform (IFFT) to them.

Thus, a first transmission power may be used for one or more subchannels having a frequency corresponding to the first narrowband channel which the first narrowband terminal is able to receive on, and a second transmission power may be used for the rest of the subchannels of the wideband channel. The first transmission power may be higher than the second transmission power. As a result, the likelihood that the first narrowband terminal will be able to receive the preamble is increased without having to affect the performance of the wideband terminals in terms of range and transmission power due to that the wideband receiver uses the total power of the wideband signal and the total power may be kept at a constant level.

In some embodiments, if the AP determines that the preamble was not received by the first narrowband terminal it may decrease the second transmission power of the preamble.

Since the first transmission power is increased, a decrease in the second transmission power will have no affect of the total range and power of the transmission over the wideband channel.

Figure 3A:
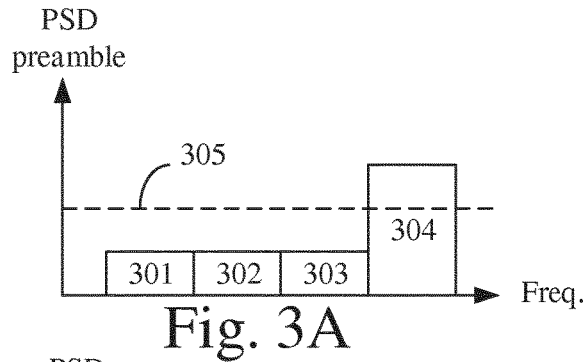
FIGS. 3A and 3B each illustrates a plot of scaled transmission power according to some embodiments.

FIG. 3A illustrates a wideband channel (e.g. the wideband channel described in conjunction with any of FIGS. 1-2) being divided into subchannels. The subchannels 301, 302, 303, and 304 may all be utilized by one or more wideband terminals (e.g. the wideband terminals 101, 102, 103 described in FIG. 1 and/or the wideband terminals described in FIG. 2) and together they have a bandwidth which corresponds to the wideband channel, whereas one or more narrowband terminals (e.g. the narrowband terminal 104 of FIG. 1 or the narrowband terminal described in FIG. 2) may utilize only subchannel 304 having a frequency which corresponds to a narrowband channel located within the wideband channel.

The Y-axis shows the power spectrum density (PSD) of the preamble, and the X-axis shows the frequency of the wideband channel.

The preamble is transmitted over all of the subchannels 301, 302, 303, 304, however, the part of the preamble which is transmitted on subchannel 304 is transmitted with a first transmission power which is higher than a second transmission power used for transmitting the preamble over the remaining subchannels 301, 302, 303.

The dotted line 305 shows where the transmission power level may normally be when no boost is made to any of the subchannels, i.e., when the transmitted power level is the same for all subchannels.

However, the total transmission power of the preamble should not be increased or at least not exceed a maximum power level when one subchannel is boosted. In order not to increase the total sent effect during the preamble it is possible to decrease the power level of the remaining subchannels. Examples of reasonable power offsets between the subchannels that may be used are e.g. 3 dB, 5 dB, or 10 dB.

Figure 3B:
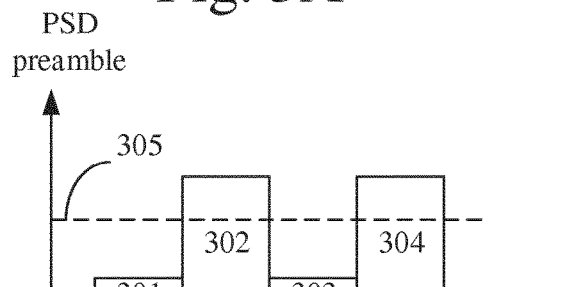

FIG. 3B illustrates a similar scenario as that of FIG. 3A, but where the transmission power is boosted for the two subchannels 303, 304 and decreased for the two subchannels 301, 302. The wireless network may e.g. comprise more than one narrowband terminal, which may receive the preamble on different subchannels. The different subchannels may e.g. make up one or more narrowband channels. Alternatively, or additionally, the wireless network may comprise a narrowband terminal configured to receive the preamble on a subset of the plurality of subchannels 301, 302, 303, 304.

Thus, the preamble is transmitted with a boosted transmission power on subchannels 302, 304, and transmitted with a decreased transmission power on the subchannels 301, 302.

The AP may e.g. initiate a down link transmission for a second narrowband terminal and transmit the preamble over the wideband channel for synchronization of the second narrowband terminal.

A fourth transmission power of the preamble in a second narrowband channel comprised within the wideband channel is higher than the second transmission power of the preamble in the remainder of the wideband channel not comprising the one or more narrowband channels.

Thus, a first narrowband terminal (e.g. the narrowband terminal described in conjunction with any of FIGS. 1, 2 and 3A) may receive on a first narrowband channel, e.g. subchannel 303, and the second narrowband terminal may receive on the a second narrowband channel, e.g. subchannel 304.

Thus, the AP may utilize a fourth transmission power of the preamble in the second narrowband channel which is higher than the transmission power which is used for the remainder of the wideband channel, i.e. subchannels 301, 302.

It may not always be necessary to transmit the preamble with different transmission powers. Network parameters such as network topology, size, signal quality, signal strength, amount of network traffic, etc, may affect the probability that the preamble will be received by all terminals in a network without having to boost any part of the transmission power. For instance, in a small wireless network where all terminals are in close range to the AP, it may not be necessary to alter the transmission power since the probability that the terminals will receive the preamble at equal transmission power is high.

Thus, in some embodiments, the AP may start with transmitting the preamble with equal transmission power on all subchannels of the wideband channel. This is illustrated by the method 400 in FIG. 4.

The method 400 starts in 401 where the AP (e.g. any of the APs described in conjunction with any of the FIGS. 1-3) initiates a DL-transmission for at least one wideband terminal and at least one narrowband terminal present in a wireless network comprising at least one wideband channel.

In 402 the AP transmits a preamble over the wideband channel for synchronization of the at least one wideband terminal and the at least one narrowband terminal.

In 403, the AP determines if the preamble was received by the at least one narrowband terminal, e.g. by determining if a reception message (such as an acknowledgement message or non-acknowledgement message) has been received from the narrowband terminal. If the AP determines that the preamble has been received by the narrowband terminal (Yes-path out of 403), the AP continues in 406 with transmissions using normal transmission flow, i.e. a new preamble is sent having no additional boosting to the transmission power.

If the AP determines that the preamble was not received by the at least one narrowband terminal (No-path out of 403), then in 404 the AP increases a first transmission power of the preamble in a narrowband channel comprised within the wideband channel. Thus, the part of the preamble which is intended for the narrowband terminal is transmitted with boosted transmission power, increasing the likelihood that the narrowband terminal will be able to receive it.

As mentioned above, the total transmission power of the preamble should not be increased arbitrarily. Furthermore, increasing the preamble power level for all subchannels is not wanted if strict power constraints or spectrum restrictions must be met. Also, high power levels increase interference and limits possibility for frequency reuse. In fact, the increased preamble power may only be needed for the case when an extra robust channel is required, for instance to increase available range.

Thus, it may be beneficial in some embodiments to determine if the transmission power of the preamble has reached a maximum level prior to increasing any part of the preamble transmission power, and if so, the method 400 may continue in 405 where the AP decreases a second transmission power of the preamble. The second transmission power may be used for transmitting the preamble over the remaining part of the wideband channel, i.e. the range not comprising the narrowband channel.

In some embodiments, if the AP determines that the maximum transmission power for the preamble has been reached for the subchannel where the narrowband terminal operates, it may determine if it is possible to further decrease the transmission power of the preamble in the other remaining subchannels of the wideband channel (compare with FIG. 3).

If it is possible to decrease the transmission power in the other remaining subchannels, the AP may do so in order to further increase the transmission power in the subchannel supporting the narrowband terminal.

However, if the AP determines that no further increase or decrease can be made to the transmission power in any of the subchannels, then it may determine to not transmit anything to the narrowband terminal which has not been able to receive the preamble at maximum transmission power level.

Furthermore, power spectral density regulations may be expressed as radiated power during a transmission burst on all antennas of the AP.

A weighted power spectral density of the preamble and data in the narrowband frequency range comprised within the wideband channel should for that reason preferably be below a power spectral density threshold.

The power spectral density threshold may e.g. be 10 dBm per MHz. The skilled person would however realize that other values are possible, and may e.g. be determined based on different network parameters for different network scenarios.

Therefore, if there is no headroom to increase the average power level it may be necessary to reduce transmission power of the control and data transmission following the preamble in order to avoid violating spectrum regulations in the band with increased preamble power.

In this disclosure the term data or data transmission is regarded to include also the control frames. Thus, the terms control and data may be used interchangeably with the terms data and data transmission Decreasing the transmission power for the control and data transmission can preferably be combined with choosing a robust modulation coding scheme (MCS) with high redundancy, i.e., a lower MCS.

Using a more robust modulation coding scheme results in a more robust data transmission, which makes it possible to lower the transmission power of the control and data transmission.

Figure 5A:
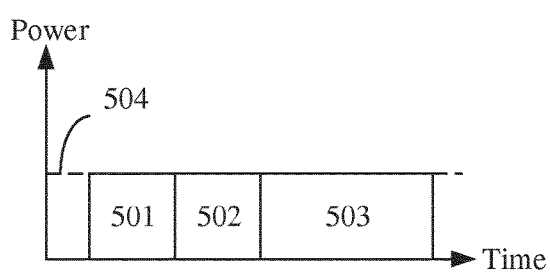
FIGS. 5A, 5B and 5C each illustrates a plot of scaled transmission power according to some embodiments.

FIG. 5A illustrates schematically the transmission power level of the preamble 501 and of the control 502 and data 503 when no boost in transmission power has been made. Thus, the transmission power in FIG. 5A is on a normal, or reference, level 504 which is equal for preamble, control and data transmission.

Figure 5B:
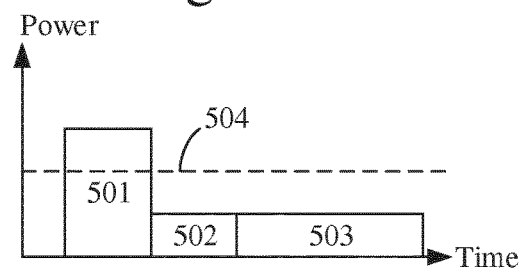

In FIG. 5B, on the other hand, the transmission power for the preamble 501 has been boosted to be above the normal, or reference, level 504, whereas the transmission power of the control 502 and data 503 has been decreased so that the weighted value of the power spectral density of the preamble, control and data is not increased resulting in that the power spectral density threshold is not exceeded.

Figure 5C:
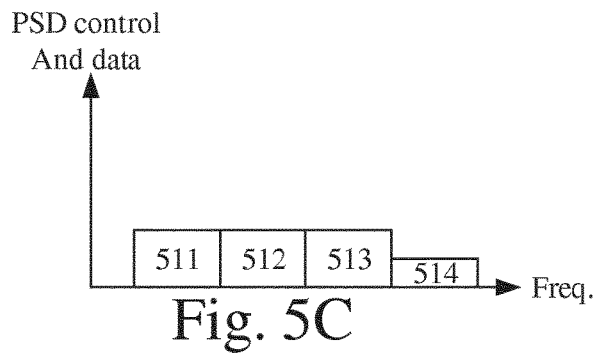

FIG. 5C illustrates how the control and data transmission may be affected in the subchannels 511, 512, 513, 514 of the wideband frequency range in order to avoid that the power spectral density threshold is exceeded when the preamble has been boosted for one subchannel 514.

The Y-axis shows the power spectrum density (PSD) of the control and data, and the X-axis shows the frequency of the wideband channel.

In some embodiments, the subchannels 511, 512, 513, 514 of FIG. 5C may respectively correspond to the subchannels 301, 302, 303, 304 of FIG. 3A.

FIG. 5C shows that the power of the control and data transmitted in the subchannel 514 is decreased in comparison to the power of the control and data transmitted in the subchannels 511, 512, 513, since the preamble of the subchannel 514 was transmitted with boosted transmission power (compare to FIG. 3A).

Thus, the AP may transmit data in the narrowband channel (subchannel 514) comprised within the wideband channel (subchannels 511, 512, 513, 514) to a first narrowband terminal. The AP may transmit the preamble to the narrowband terminal using a first transmission power, and transmit the preamble to the wideband terminal using a second transmission power. The AP may furthermore transmit the data to the narrowband terminal using a third transmission power of the data.

The third transmission power of the data in the narrowband channel comprised within the wideband channel is lower than the first transmission power of the preamble in the narrowband channel comprised within the wideband channel.

In order to be able to decrease the transmission power of the control and data transmission, the robustness of the control and data transmission may be increased.

As the channel condition is indicated by the MCS (modulating and coding scheme) value, one possibility of some embodiments is to add lower MCS values with boosted preamble power level. This can be achieved by increasing the range of MCS values and letting the preamble power be a function of the MCS value for low MCS. In order to correctly receive the control and data there is potentially a need to increase coding gain for the MCS values with boosted preamble.

Figure 6:
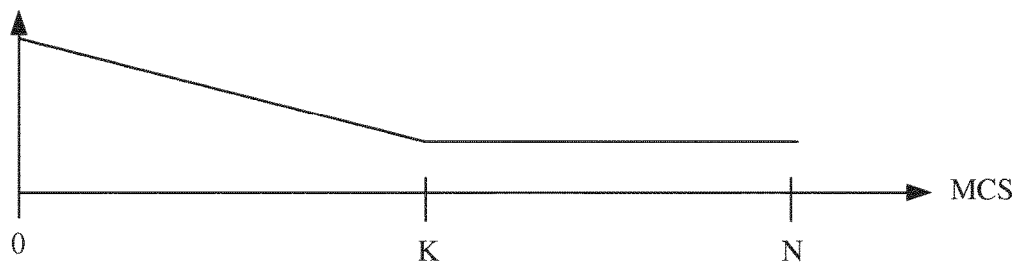
FIG. 6 is plot illustrating example ranges according to some embodiments.

FIG. 6 illustrates this schematically, the MCS range with boosted transmission power of the preamble is in the range MCS 0-MCS(K−1) and MCS without boosted transmission power of the preamble is in the range MCS K-MCS N, where K and N may be numerical values.

The preamble transmission power can then be expressed as a function of the MCS value (Preamble transmission power=f(MCS)).

Thus, a maximum boosted transmission power of a preamble will, according to some embodiments, have the MCS value MCS 0 and a preamble with no boosted transmission power will in some embodiments have the MCS value MCS K-MCS N.

Thus, if e.g. in either of the methods 200 or 400 it is determined by the AP that the preamble was not received by the narrowband terminal, the AP may also increase a robustness of data sent in the first narrowband channel.

Figure 4:
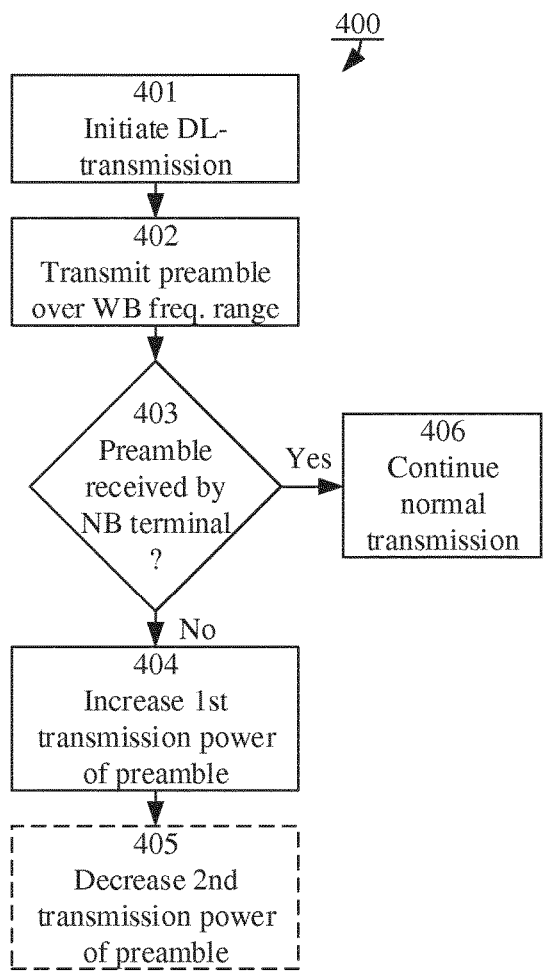
FIG. 4 is a flow chart illustrating example method steps according to some embodiments.

This is illustrated by method 700 in FIG. 7, which may be combined with either of the methods 200 and 400 of FIGS. 2 and 4.

The method 700 starts in 701 where an AP initiates a DL transmission to one or more wideband and a first narrowband terminal in a wireless network. The wireless network utilizes at least one wideband channel, and the one or more wideband terminals are configured to operate in the wideband channel, whereas the first narrowband terminal is configured to operate in a first narrowband channel within the wideband channel.

It should be noted that the methods 200, 400 and 700 are also applicable when a transmission is sent over more than one narrowband channels to more than one narrowband terminal, e.g. over a first and a second narrowband channel to a first and a second narrowband terminal, compare with FIG. 3B.

In 702 the AP transmits a down link preamble together with control and data over the wideband frequency range.

The AP then determines in 703 if it has received a reception message from the first narrowband terminal that it has received the preamble.

The reception may e.g. be an acknowledgement message (ACK) or a non-acknowledgement message (NACK).

If in 703 the AP determines that it has received a reception message from the first narrowband terminal of its reception of the preamble (Yes-path out of 704), then the AP may in 704 proceed with normal transmission, i.e. transmitting a new preamble followed by data to the wideband and first narrowband terminal in the network, where the new preamble is transmitted with equal transmission power as the preamble that was received successfully by the first narrowband terminal.

If the reception message has been received it is an indication that the transmission power of the preamble was sufficient, and that the coding gain and robustness of the data-transmission may be decreased.

If in 703 the AP determines that it has not received a reception message of reception of the preamble (the AP may e.g. neither have received an acknowledgement message nor a non-acknowledgement message) from the first narrowband terminal (No-path out of 704), then the AP checks in 705 if it already is using the minimum MCS-value, i.e. MCS 0, and if so (Yes-path out of 706) the AP ends the transmission to the first narrowband terminal since neither the transmission power nor the coding gain of the data transmission can be increased further.

If the AP is not using the minimum MCS-value for the transmissions (No-path out of 705) then the AP checks if the transmission power is boosted at all, i.e. if the MCS-value is MCS K or higher. If the value is MCS K or higher (Yes-path out of 707) the AP sets in 709 the MCS-value to MCS (K−1), i.e. adds boosting to the transmission power of the preamble and increases the robustness of the data transmission. The method 700 then returns to 701 where a DL transmission is initiated, but with changed transmission power for the preamble and MCS-value.

If in 707 the AP determines that it is not using MCS K or higher (No-path out of 707), then the AP in 708 decreases the MCS value one step in order to further increase coding gain of the data transmission.

The method 700 then returns to 701 where a DL transmission is initiated again with a different MCS-value.

By varying transmission power of the preamble, and/or the transmission power of the subsequent control and data by varying the modulation and coding scheme of the data, the probability is increased that all terminals within a wireless network will receive and be synchronized by the preamble regardless of whether they operate in a wideband channel or a narrowband channel.

FIG. 8 illustrates an arrangement 800 of a network access point 801 configured to operate in a wireless network. The network access point (AP) may e.g. be any of the access points described in conjunction with any of the previous FIGS. 1-7.

The wireless network comprises at least one wideband frequency channel (e.g. the wideband channel described in any of FIGS. 1-7), wherein the wireless network further comprises one or more wideband terminals configured to transmit and receive in the wideband channel, and one or more narrowband terminals configured to transmit and receive in one or more narrowband channels comprised within the wideband channel.

In some embodiments, the wideband channel may be divided into a plurality of subchannels. The total bandwidth of the plurality of subchannels may correspond to the wideband channel bandwidth, whereas a frequency of one or a subset of the plurality of subchannels may correspond to the one or more narrowband channels (compare with FIGS. 3 and 5).

The wideband and narrowband terminals may e.g. be any of the wideband and narrowband terminals described in conjunction with any of the FIGS. 1-7.

The arrangement 800 may in some embodiments be configured to carry out any of the methods 200, 400 and 700 described in conjunction with FIGS. 2, 4 and 7.

The arrangement 800 may in some embodiments comprise a transceiver (RX/TX) 802 and a controller (CNTR) 803.

The transceiver 802 may in some embodiments be a separate receiver and transmitter.

The controller 803 may in some embodiments further comprise a determiner (DET) 804 configured to determine if a preamble has been received by a first narrowband terminal, a power unit (POWER) 805 configured to determine the level of, and set the transmission power of the preamble, a modulating and coding scheme unit (MCS) 806 configured to determines the level of, and set the coding gain of a data transmission following the preamble.

The controller 803 may be configured to cause initiation of a down link transmission for at least one of the one or more wideband terminals and for the first narrowband terminal. The controller 803 may e.g. cause the transceiver 802 to transmit a preamble over the wideband channel for synchronization of the at least one wideband terminal and the first narrowband terminal.

The controller 803 may also in some embodiments, prior to causing the transceiver 802 to transmit the preamble, cause the power unit 805 to set a first transmission power of the preamble in a first narrowband channel comprised within the wideband channel such that it is higher than a second transmission power of the preamble in the remainder of the wideband channel not comprising the one or more narrowband channels.

In some embodiments, the controller 803 may be further configured to cause the determiner 804 to determine whether the preamble was received by the first narrowband terminal.

Determination of whether the preamble was received by the first narrowband terminal may further comprises causing the determiner 804 to determine whether an acknowledgement has been received from the first narrowband terminal.

In some embodiments, the controller 803 may be further configured to cause the power unit 805 to, if it is determined that the preamble has not been received by the first narrowband terminal, increase the first transmission power of the preamble in the first narrowband channel comprised within the wideband channel.

In some embodiments, the controller 803 may further be configured to cause the power unit 805 to, if it is determined that the preamble has not been received by the first narrowband terminal, decrease the second transmission power of the preamble in the remainder of the wideband channel not comprising the one or more narrowband channels, compare e.g. with the methods of any of the FIGS. 2 and 4.

In some embodiments, the controller 803 may be further configured to cause the MCS-unit 806 to, if it is determined that the preamble has not been received by the first narrowband terminal, increase of a robustness of data sent in first narrowband channel e.g. by performing the method 700 described in FIG. 7.

The MCS-unit 806 may e.g. be configured to decrease a modulating and coding scheme value of the data. This results in more robust data transmission. Since the data is transmitted with better robustness, it may also be transmitted at a lower transmission power.

The controller 803 may e.g. cause the transceiver 803 to transmit data in the first narrowband channel comprised within the wideband channel to first narrowband terminal, and cause the power unit 805 to set a third transmission power of the data transmission in the one or more narrowband channels comprised within the wideband channel such that it is lower than the first transmission power of the preamble in the first narrowband channel comprised within the wideband channel.

The controller 803 may be configured to, alternatively or additionally, further cause the MCS-unit 806 to decrease the MCS value of the data transmission so that the robustness of the transmission is increased.

In some embodiments, the controller 803 may further be configured to set a weighted power spectral density of the preamble and data in the one or more narrowband channels comprised within the wideband channel such that it is below a power spectral density threshold.

In some embodiments, the controller 803 may further be configured to cause initiating of a down link transmission for a second narrowband terminal (e.g. the second narrowband terminal described in conjunction with FIG. 3B) and transmission of the preamble over the wideband channel for synchronization of the second narrowband terminal.

The controller 803 may furthermore be configured to cause a fourth transmission power of the preamble in a second narrowband channel comprised within the wideband channel to be higher than the second transmission power of the preamble in the remainder of the wideband channel not comprising the one or more narrowband channels.

FIG. 9 illustrates a computer program product 900 comprising a computer readable medium (for example, a diskette or a CD-ROM), having thereon a computer program comprising program instructions, the computer program being loadable into a data-processing unit 901 comprising a memory (MEM) 902 and a processor (PROC) 903 and adapted to cause execution of any of the method 200, 400, 700 of FIGS. 2, 4, 7 when the computer program is run by the data-processing unit 901.

The methods and arrangements disclosed herein enables reliable and robust communication in a wireless network where wideband and narrowband terminals operate concurrently.

By varying the transmission power over the bandwidth of a wideband channel in a wireless network such that the transmission power is boosted for narrowband frequencies in the wideband channel and possibly decreased for the remaining wideband channel, the probability that all terminals within the wireless network will be able to receive the preamble is increased. Thus, network communication is made more robust and reliable.

The embodiments furthermore provide a possibility to handle a rapidly increasing number of IoT-devices and better utilization of the unlicensed bands in wireless network environments.

The described embodiments and their equivalents may be realized in software or hardware or a combination thereof. They may be performed by general-purpose circuits associated with or integral to a communication device, such as digital signal processors (DSP), central processing units (CPU), co-processor units, field-programmable gate arrays (FPGA) or other programmable hardware, or by specialized circuits such as for example application-specific integrated circuits (ASIC). All such forms are contemplated to be within the scope of this disclosure.

Embodiments may appear within an electronic apparatus (such as a wireless communication device) comprising circuitry/logic or performing methods according to any of the embodiments. The electronic apparatus may, for example, be a portable or handheld mobile radio communication equipment, a mobile radio terminal, a mobile telephone, a base station, a base station controller, a pager, a communicator, an electronic organizer, a Smartphone, a computer, a notebook, a USB-stick, a plug-in card, an embedded drive, or a mobile gaming device.

Reference has been made herein to various embodiments. However, a person skilled in the art would recognize numerous variations to the described embodiments that would still fall within the scope of the claims. For example, the method embodiments described herein describes example methods through method steps being performed in a certain order. However, it is recognized that these sequences of events may take place in another order without departing from the scope of the claims. Furthermore, some method steps may be performed in parallel even though they have been described as being performed in sequence.

In the same manner, it should be noted that in the description of embodiments, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit without departing from the scope of the claims.

Hence, it should be understood that the details of the described embodiments are merely for illustrative purpose and by no means limiting. Instead, all variations that fall within the range of the claims are intended to be embraced therein.

The invention claimed is:

1. A method of a network access point configured to operate in a wireless network, wherein the wireless network comprises at least one wideband channel, and wherein the wireless network further comprises one or more wideband terminals configured to transmit and receive in the wideband channel, and one or more narrowband terminals configured to transmit and receive in one or more narrowband channels comprised within the wideband channel, the method comprising:

initiating a down link transmission for at least one of the one or more wideband terminals and for a first narrowband terminal; and transmitting a preamble over the wideband channel for synchronization of the at least one wideband terminal and the first narrowband terminal, wherein a first transmission power of the preamble in a first narrowband channel comprised within the wideband channel is higher than a second transmission power of the preamble in the remainder of the wideband channel not comprising the one or more narrowband channels.

2. The method according to claim 1, further comprising:
 determining whether the preamble was received by the first narrowband terminal,
 wherein determining whether the preamble was received by the first narrowband terminal comprises:
 determining whether a reception message has been received from the first narrowband terminal.

3. The method according to claim 2, further comprising:
 if it is determined that the preamble has not been received by the first narrowband terminal:
 increasing the first transmission power of the preamble in the first narrowband channel.

4. The method according to claim 2 further comprising:
 if it is determined that the preamble has not been received by the first narrowband terminal:
 decreasing the second transmission power of the preamble in the remainder of the wideband channel not comprising the one or more narrowband channels.

5. The method according to claim 2 further comprising:
 if it is determined that the preamble has not been received by the first narrowband terminal:
 increasing a robustness of data sent in the first narrowband channel.

6. The method of claim 2 further comprising:
- transmitting data in the first narrowband channel comprised within the wideband channel to the first narrowband terminal;
- wherein a third transmission power of the data in the first narrowband channel comprised within the wideband channel is lower than the first transmission power of the preamble in the first narrowband channel comprised within the wideband channel.

7. The method of claim 6 wherein a weighted power spectral density of the preamble and data in the first narrowband channel comprised within the wideband channel is below a power spectral density threshold.

8. The method of claim 1, further comprising:
- initiating a down link transmission for a second narrowband terminal;
- transmitting the preamble over the wideband channel for synchronization of the second narrowband terminal;
- wherein a fourth transmission power of the preamble in a second narrowband channel comprised within the wideband channel is higher than the second transmission power of the preamble in the remainder of the wideband channel not comprising the one or more narrowband channels.

9. A non-transitory computer readable storage medium, having thereon a computer program comprising program instructions, the computer program being loadable into a data-processing unit comprising a memory and processor and adapted to cause execution of a method when the computer program is run by the data-processing unit, wherein the method is of a network access point configured to operate in a wireless network, wherein the wireless network comprises at least one wideband channel, and wherein the wireless network further comprises one or more wideband terminals configured to transmit and receive in the wideband channel, and one or more narrowband terminals configured to transmit and receive in one or more narrowband channels comprised within the wideband channel, the method comprising:
- initiating a down link transmission for at least one of the one or more wideband terminals and for a first narrowband terminal; and
- transmitting a preamble over the wideband channel for synchronization of the at least one wideband terminal and the first narrowband terminal,
- wherein a first transmission power of the preamble in a first narrowband channel comprised within the wideband channel is higher than a second transmission power of the preamble in the remainder of the wideband channel not comprising the one or more narrowband channels.

10. An arrangement of a network access point configured to operate in a wireless network, wherein the wireless network comprises at least one wideband channel, wherein the wireless network further comprises one or more wideband terminals configured to transmit and receive in the wideband channel, and one or more narrowband terminals configured to transmit and receive in one or more narrowband channels comprised within the wideband channel, and wherein the arrangement comprises a transceiver and a controller configured to cause:
- initiation of a downlink transmission for at least one of the one or more wideband terminals and for a first narrowband terminals; and
- transmission of a preamble over the wideband channel for synchronization of the at least one wideband terminal and the first narrowband terminal,
- wherein a first transmission power of the preamble in a first narrowband channel comprised within the wideband channel is higher than a second transmission power of the preamble in the remainder of the wideband channel not comprising the one or more narrowband channels.

11. The arrangement according to claim 10, wherein the controller is further configured to cause:
- determination of whether the preamble was received by the first narrowband terminal,
- wherein determination of whether the preamble was received by the first narrowband terminal comprises causing:
- determination of whether a reception message has been received from the first narrowband terminal.

12. The arrangement according to claim 11, wherein the controller is further configured to cause, if it is determined that the preamble has not been received by the first narrowband terminal:
- increase of the first transmission power of the preamble in the first narrowband channel comprised within the wideband channel.

13. The arrangement according to claim 11, wherein the controller is further configured to cause, if it is determined that the preamble has not been received by the first narrowband terminal:
- decrease of the second transmission power of the preamble in the remainder of the wideband channel not comprising the one or more narrowband channels.

14. The arrangement according to claim 11, wherein the controller is further configured to cause, if it is determined that the preamble has not been received by the first narrowband terminal:
- increase of a robustness of data sent in the first narrowband channel.

15. The arrangement of claim 11 wherein the transceiver and controller is further configured to cause:
- transmission of data in the first narrowband channel comprised within the wideband channel to the first narrowband terminal;
- wherein a third transmission power of the data in the first narrowband channel comprised within the wideband channel is lower than the first transmission power of the preamble in the first narrowband channel comprised within the wideband channel.

16. The arrangement of claim 15 wherein a weighted power spectral density of the preamble and data in the first narrowband channel comprised within the wideband channel is below a power spectral density threshold.

17. The arrangement of claim 10, wherein the controller is further configured to cause:
- initiation of a downlink transmission for a second narrowband terminal;
- transmission of the preamble over the wideband channel for synchronization of the second narrowband terminal;
- wherein a fourth transmission power of the preamble in the second narrowband channel comprised within the wideband channel is higher than the second transmission power of the preamble in the remainder of the wideband channel not comprising the one or more narrowband channels.

18. A network access point comprising the arrangement according to claim 10.

* * * * *